(12) United States Patent
Sugawara

(10) Patent No.: US 10,802,211 B2
(45) Date of Patent: Oct. 13, 2020

(54) FIBER OPTIC PLATE AND METHOD FOR PRODUCING THE SAME

(71) Applicant: HAMAMATSU PHOTONICS K.K., Hamamatsu-shi, Shizuoka (JP)

(72) Inventor: Takeo Sugawara, Hamamatsu (JP)

(73) Assignee: HAMAMATSU PHOTONICS, K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/238,004

(22) Filed: Jan. 2, 2019

(65) Prior Publication Data

US 2019/0154915 A1  May 23, 2019

Related U.S. Application Data

(62) Division of application No. 15/640,791, filed on Jul. 3, 2017, now Pat. No. 10,209,441, which is a division
(Continued)

(30) Foreign Application Priority Data

Nov. 19, 2008 (JP) ................. 2008-295615

(51) Int. Cl.
| | |
|---|---|
| *G02B 6/08* | (2006.01) |
| *C03C 3/064* | (2006.01) |
| *C03C 3/093* | (2006.01) |
| *C03C 3/102* | (2006.01) |
| *C03C 4/08* | (2006.01) |
| *C03C 13/04* | (2006.01) |

(52) U.S. Cl.
CPC ............... *G02B 6/08* (2013.01); *C03C 3/064* (2013.01); *C03C 3/093* (2013.01); *C03C 3/102* (2013.01); *C03C 4/08* (2013.01); *C03C 13/046* (2013.01)

(58) Field of Classification Search
CPC .......... G02B 6/06; C03C 3/064; C03C 3/093; C03C 3/102
See application file for complete search history.

(56) References Cited

U.S. PATENT DOCUMENTS 3,253,500 A * 5/1966 Hicks, Jr. ................ G02B 6/08
385/120
4,415,810 A * 11/1983 Brown, Sr. ........... G01T 1/1641
250/367
(Continued)

FOREIGN PATENT DOCUMENTS

| JP | H0-050878 A | 2/1992 |
|---|---|---|
| JP | H04-177304 A | 6/1992 |

(Continued)

*Primary Examiner* — Chris H Chu
(74) *Attorney, Agent, or Firm* — Faegre Drinker Biddle & Reath LLP

(57) ABSTRACT

In an FOP 1, a glass body 8 is configured by including antimicrobial glass portions 10 made of antimicrobial glass containing Ag$_2$O. Here, the glass containing silver does not have chemical durability, so that it has properties to easily emit Ag ions due to moisture. Ag ions have an excellent antimicrobial effect. Therefore, by configuring the glass body 8 to include the antimicrobial glass portions 10 containing Ag$_2$O, the glass body 8 can obtain a sterilization effect due to the action of Ag ions. Therefore, the FOP 1 can be provided with antimicrobial activities.

1 Claim, 12 Drawing Sheets

Related U.S. Application Data of application No. 13/130,013, filed as application No. PCT/JP2009/066653 on Sep. 25, 2009, now abandoned.

(56) References Cited

U.S. PATENT DOCUMENTS

| | | | | |
|---|---|---|---|---|
| 5,319,731 | A * | 6/1994 | Eastman | G02B 6/03622 385/115 |
| 5,678,080 | A * | 10/1997 | Miyamoto | G02B 6/08 396/267 |
| 5,684,905 | A * | 11/1997 | Sugawara | A61B 5/1172 362/554 |
| 6,038,360 | A * | 3/2000 | Sugawara | G02B 6/06 385/116 |
| 7,221,835 | B1 * | 5/2007 | Weisser | C03B 37/01211 385/116 |
| 2008/0085326 | A1 * | 4/2008 | Ruan | A61K 33/00 424/618 |
| 2008/0273168 | A1 * | 11/2008 | Rathore | A61L 12/08 351/159.33 |
| 2008/0286713 | A1 * | 11/2008 | Nanda | A46B 5/0002 433/29 |
| 2009/0060967 | A1 * | 3/2009 | Kamiya | A01N 25/12 424/409 |
| 2009/0137771 | A1 * | 5/2009 | Moriyama | A61K 6/0023 528/380 |
| 2015/0090475 | A1 * | 4/2015 | Ranganathan | A01N 59/16 174/113 R |

FOREIGN PATENT DOCUMENTS

| | | |
|---|---|---|
| JP | H06-100329 A | 4/1994 |
| JP | H06-289262 A | 10/1994 |
| JP | H07-088236 A | 4/1995 |
| JP | H07-300339 A | 11/1995 |
| JP | H08-048539 A | 2/1996 |
| JP | H04-091847 A | 4/1996 |
| JP | H08-245237 A | 9/1996 |
| JP | H10-158037 A | 6/1998 |
| JP | H11-228186 A | 8/1999 |
| JP | 2000-063451 A | 2/2000 |
| JP | 2000-169185 A | 6/2000 |
| JP | 2000-191339 A | 7/2000 |
| JP | 2000-203876 A | 7/2000 |
| JP | 2000-313624 A | 11/2000 |
| JP | 2000-327364 A | 11/2000 |
| JP | 2001-097735 A | 4/2001 |
| JP | 2001-226139 A | 8/2001 |
| JP | 2001-240426 A | 9/2001 |
| JP | 2001-247333 A | 9/2001 |
| JP | 2002-037643 A | 2/2002 |
| JP | 2002-076854 A | 3/2002 |
| JP | 2003-242488 A | 8/2003 |
| JP | 2003-267749 A | 9/2003 |
| JP | 2005-107308 A | 4/2005 |
| JP | 2008-197377 A | 8/2008 |
| KR | 20-0396126 Y1 | 9/2005 |
| WO | WO-2005/087675 A1 | 9/2005 |

* cited by examiner

*Fig.6*

| Material | Size |
|---|---|
| Core glass | φ30 |
| Clad glass | φ40 (thickness: 4.0) |
| Absorber glass | φ4 |
| Antimicrobial glass | φ4 |

Fig.7

| | Specimen No. | Core glass | Clad glass | Absorber glass | Antimicrobial glass |
|---|---|---|---|---|---|
| Composition[wt%] | SiO2 | 57.6 | 68.22 | 44 | 7.5 |
| | B2O3 | 1 | 0.79 | | 30 |
| | Al2O3 | | 1.6 | | 10 |
| | Na2O | 4.7 | 15.21 | | 2 |
| | K2O | 8.5 | 2.11 | 10 | |
| | MgO | | 0.85 | | |
| | CaO | 1.4 | 8.91 | | 25 |
| | BaO | | | | 25.5 |
| | ZnO | | 0.43 | | |
| | PbO | 26.6 | | 26 | |
| | Fe3O4 | | | 20 | |
| | Ag2O | | | | 0.5 |
| | As2O3 | 0.2 | | | |
| Total [%] | | 100 | 98.12 | 100 | 100.5 |
| Refractive index nd | | 1.561 | 1.516 | | |
| Thermal expansion coefficient $\alpha$ [$10^{-7}$/°C] | | 99.4 | 98.5 | 86.9 | 102 |
| Transition point Tg [°C] | | 451 | 515 | 480 | 553 |
| Yield point At [°C] | | 517 | 570 | 549 | 599 |

Fig.8

| | Specimen No. | 1 | 2 | 3 | 4 | 5 | 6 | 7 | 8 | 9 | 10 | 11 | 12 |
|---|---|---|---|---|---|---|---|---|---|---|---|---|---|
| Composition [wt%] | $B_2O_3$ | 22 | 20 | 18 | 20 | 20 | 20 | 20 | 20 | 30 | 24 | 30 | 27.5 |
| | $SiO_2$ | 6 | 6 | 6 | 10 | 6 | 6 | 6 | 6 | 20 | 20 | 7.5 | 20 |
| | $Al_2O_3$ | 10.7 | 10.7 | 10.7 | 6.7 | 10.7 | 10.2 | 9.7 | 7.7 | 10 | 10 | 10 | 10 |
| | $Na_2O$ | 0.3 | 0.3 | 0.3 | 0.3 | 0.3 | 0.3 | 0.3 | 0.3 | 2 | 2 | 2 | 4.5 |
| | $CaO$ | | | | | 20 | | | | | 25 | 25 | 25 |
| | $BaO$ | 61 | 63 | 65 | 63 | 43 | 63 | 63 | 63 | 25 | 19 | 25.5 | 13 |
| | $ZrO_2$ | | | | | | 0.5 | 1 | 3 | 13 | | | |
| | $Ag_2O$ | 0.5 | 0.5 | 0.5 | 0.5 | 0.5 | 0.5 | 0.5 | 0.5 | 0.5 | 0.5 | 0.5 | 0.5 |
| Total [%] | | 100.5 | 100.5 | 100.5 | 100.5 | 100.5 | 100.5 | 100.5 | 100.5 | 100.5 | 100.5 | 100.5 | 100.5 |
| Thermal expansion coefficient $\alpha$ [$10^{-7}$/°C] | | 102 | 108 | 112 | 107 | 113 | 109 | 109 | 109 | 87.3 | 92.1 | 101 | 93 |
| Transition point Tg [°C] | | 524 | 523 | 502 | 527 | 534 | 521 | 518 | 526 | 594 | 587 | 553 | 567 |
| Yield point At [°C] | | 569 | 566 | 547 | 576 | 584 | 562 | 560 | 570 | 645 | 636 | 599 | 618 |

Test microbes: Staphylococcus aureus

| Specimen name | Number of viable microbes | Antimicrobial activity value | Judgment |
|---|---|---|---|
| Embodiment | <10 | 4.0 | Antimicrobial effect observed |
| Conventional product | $1.2 * 10^5$ | — | |

(b)

Test microbes: coliform bacillus

| Specimen name | Number of viable microbes | Antimicrobial activity value | Judgment |
|---|---|---|---|
| Embodiment | <10 | 4.1 | Antimicrobial effect observed |
| Conventional product | $1.3 * 10^5$ | — | |

*Fig.10*

|  | Relative transmittance |
|---|---|
| Embodiment | 108 |
| Conventional product | 100 |

FIBER OPTIC PLATE AND METHOD FOR PRODUCING THE SAME

CROSS-REFERENCE TO RELATED APPLICATIONS

This application is a divisional application of U.S. patent application Ser. No. 15/640,791, filed Jul. 3, 2017, which is a divisional application of U.S. patent application Ser. No. 13/130,013, filed May 18, 2011, abandoned, which is the National Stage entry of PCT/JP2009/066653, filed Sep. 25, 2009, which claims the benefit of Japanese Patent Application No. 2008-295615, filed Nov. 19, 2008, the entire contents of which is incorporated herein by reference.

TECHNICAL FIELD

The present invention relates to a fiber optic plate and a method for producing the same.

BACKGROUND ART

A fiber optic plate is an optical device configured by bundling optical fibers of several microns, and is used as an optical waveguide of optical equipment such as an image intensifier, a face plate of a CRT, and a CCD coupling, etc.

As one detailed technique used in the fiber optic plate, there is fingerprint detection (direct image taking) in a fingerprint identification device. In fingerprint detection using a fiber optic plate, it is necessary that a finger of a person to be identified must be made to touch the fiber optic plate, so that in a case where fingerprints of many people to be identified are detected, people who have a resistance to touching the fiber optic plate are not negligible. Therefore, a measure for eliminating such a resistance has been demanded.

In recent years, from the point of view of sanitation and users' rising concerns about cleanliness, home electric appliances, groceries, and textile products, etc., have been required to have antimicrobial activities, and antimicrobial glass with antimicrobial activities may be contained in resins and fibers forming these products (for example, refer to Patent Documents 1 to 3).

CITATION LIST

Patent Literature

Patent Document 1: Japanese Published Unexamined Patent Application No. 2000-203876
Patent Document 2: Japanese Published Unexamined Patent Application No. 2001-247333
Patent Document 3: International Publication WO 05/087675

SUMMARY OF INVENTION

Technical Problem

Thus, antimicrobial activities of home electric appliances, groceries, and textile products, etc., are realized and realization of antimicrobial activities of a fiber optic plate has also been demanded, and a best mode for this has been demanded.

Therefore, the present invention has been made in view of these circumstances, and an object thereof is to provide a fiber optic plate with antimicrobial activities.

Solution to Problem

In order to achieve the above-described object, a fiber optic plate according to the present invention is configured by bundling a plurality of optical fibers, and includes a plurality of cores that propagates light, claddings for covering the cores, and a glass body which is disposed among the cores and has light absorbability for absorbing stray light that leaked from the cores and entered the claddings and antimicrobial activities obtained by containing silver oxide.

In this fiber optic plate, the glass body has antimicrobial activities obtained by containing silver oxide. Here, the glass containing silver oxide does not have chemical durability, so that it has properties of easily emitting Ag ions due to moisture. Ag ions have an excellent antimicrobial effect. Due to silver oxide contained in the glass body, the glass body can obtain a sterilization effect according to the action of Ag ions. Therefore, the fiber optic plate can be provided with antimicrobial activities. It is difficult to provide the cores and claddings with antimicrobial activities in terms of transmittance and production. However, by providing the glass body with antimicrobial activities, antimicrobial activities of the fiber optic plate can be realized while eliminating the above-described problem.

The fiber optic plate according to the present invention preferably includes a glass portion made of a glass material having absorbability and antimicrobial activities. With this configuration, the glass portion has antimicrobial activities, so that the fiber optic plate can be reliably provided with antimicrobial activities.

In the fiber optic plate according to the present invention, the glass body preferably includes a first glass portion made of a glass material with absorbability and a second glass portion made of a glass material with antimicrobial activities. With this configuration, the second glass portion has antimicrobial activities, so that the fiber optic plate can be reliably provided with antimicrobial activities.

In the fiber optic plate according to the present invention, the second glass portion is preferably covered by a third glass portion that does not contain silver oxide. Ag ions become metallic Ag when they coexist with Fe ions in glass. This metallic Ag may deteriorate the sterilization effect of the antimicrobial glass surface. Therefore, by covering the second glass portion that has antimicrobial activities due to containing silver oxide by a third glass portion that does not contain silver oxide, coexistence with Fe ions of the first glass portion can be avoided, so that the antimicrobial effect can be prevented from being deteriorated. As a result, the fiber optic plate can be more reliably provided with antimicrobial activities.

A method for producing a fiber optic plate according to the present invention is for producing a fiber optic plate configured by bundling a plurality of optical fibers, and by the method, a plurality of cores that propagate light, claddings that cover the cores, and a glass body which is disposed among the cores and has light absorbability for absorbing stray light that leaked from the cores and entered the claddings and antimicrobial activities obtained by containing silver oxide, are integrated.

According to this method for producing a fiber optic plate, the above-described fiber optic plate according to the present invention can be preferably produced.

Advantageous Effects of Invention

According to the present invention, a fiber optic plate can be provided with antimicrobial activities.

BRIEF DESCRIPTION OF DRAWINGS

FIG. 6 is a diagram showing sizes of constituent materials of the fiber optic plate.

FIG. 7 is a diagram showing examples of compositions and characteristics of constituent materials of the fiber optic plate.

FIG. 8 is a diagram showing compositions and characteristics of antimicrobial glasses used for manufacturing the fiber optic plate.

FIG. 9 are diagrams showing antimicrobial effect judgment results of the fiber optic plate.

FIG. 10 is a diagram showing relative transmittances of a conventional fiber optic plate and a fiber optic plate of the embodiment.

DESCRIPTION OF EMBODIMENTS

Figure 1:
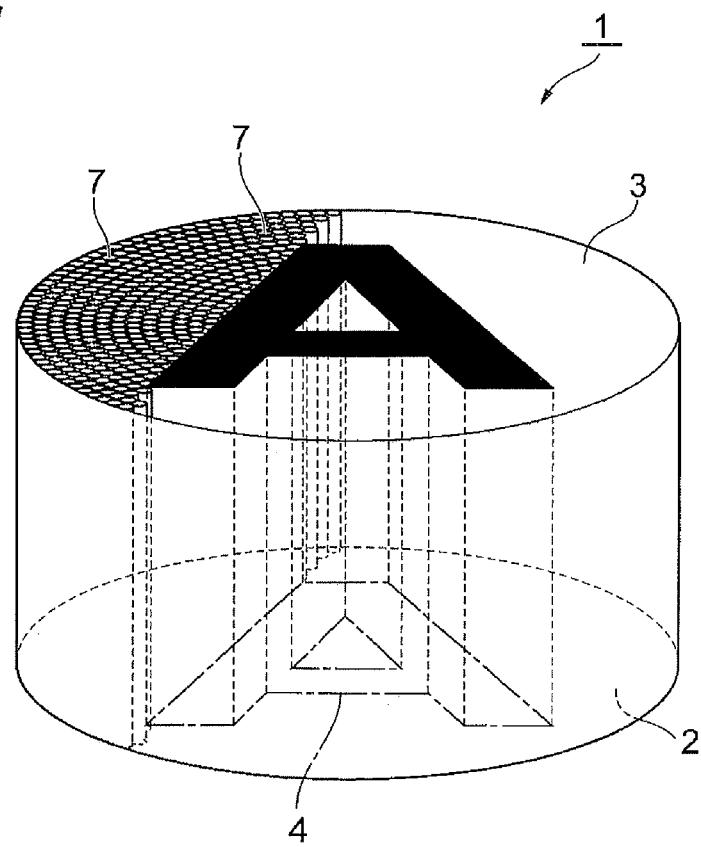
FIG. 1 is a perspective view of a fiber optic plate according to a first embodiment of the present invention.

Hereinafter, preferred embodiments of the present invention will be described in detail with reference to the drawings. In the drawings, portions identical or equivalent to each other are provided with the same reference numeral, and overlapping description will be omitted.

First Embodiment

FIG. 1 is a perspective view of a fiber optic plate according to a first embodiment of the present invention. The fiber optic plate (hereinafter, referred to as FOP) 1 shown in FIG. 1 is a columnar optical device configured by bundling a plurality of optical fibers 7, and has an incidence plane 2 and an exit plane 3. The FOP 1 has a function of transmitting light and image 4 that entered from the incidence plane 2 to the exit plane 3, and is used as an optical waveguide of optical equipment, for example, an image intensifier, a face plate of a CRT, a CCD coupling, and a fingerprint detection device, etc.

Figure 2:
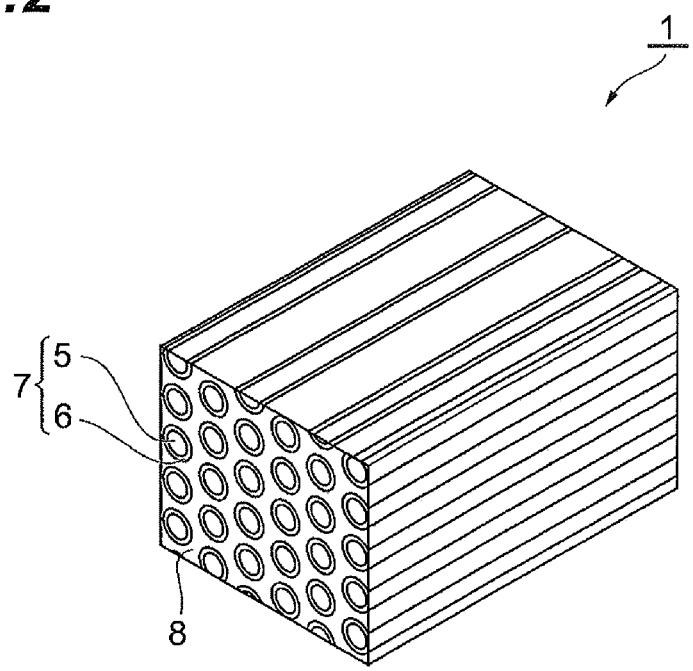
FIG. 2 is a perspective view of an internal structure of the fiber optic plate in an enlarged manner.
Figure 3:
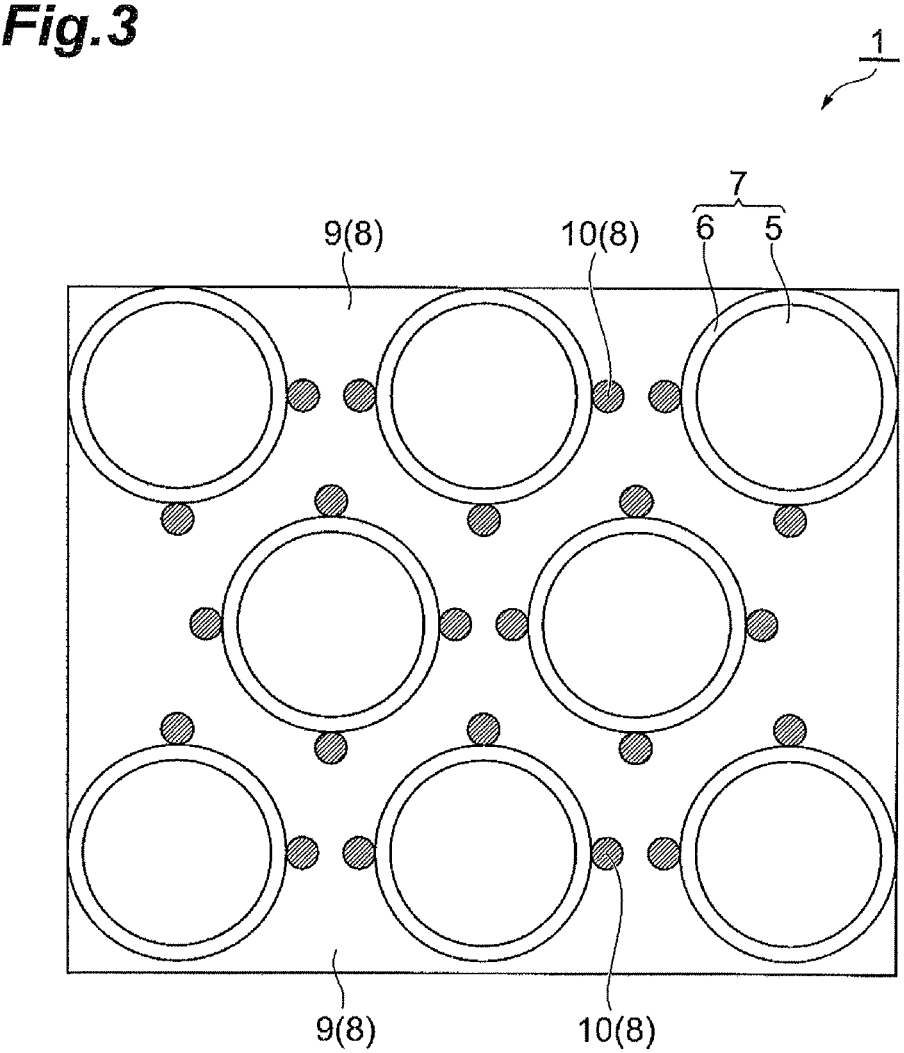
FIG. 3 is a sectional view of a part of FIG. 2 in an enlarged manner.
Figure 4:
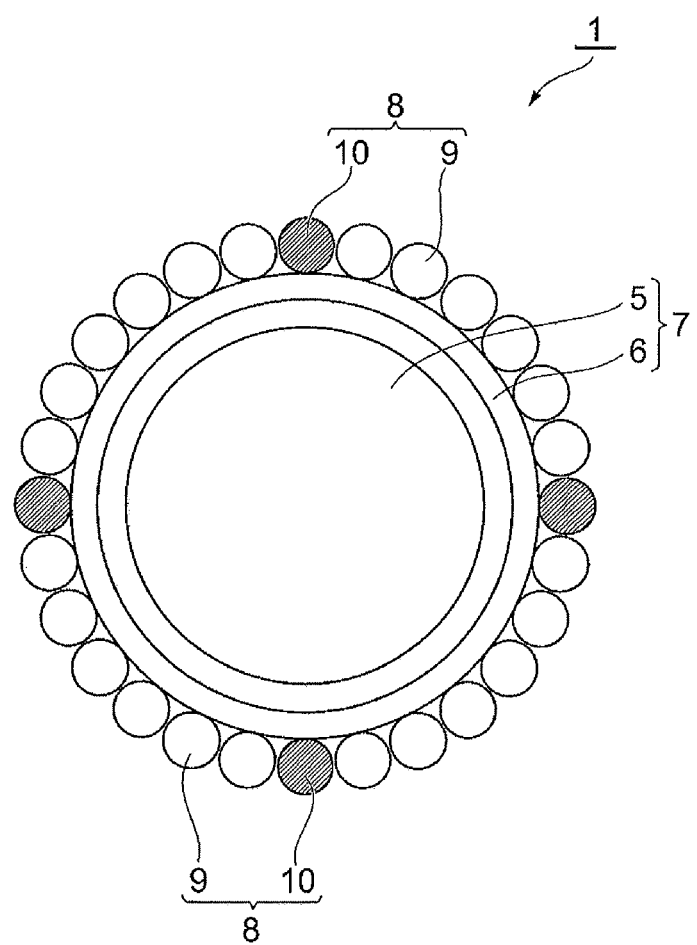
FIG. 4 is a sectional view showing a part of FIG. 3 in a further enlarged manner.

FIG. 2 is a perspective view showing an internal structure of the FOP in an enlarged manner. FIG. 3 is a sectional view of a part of FIG. 2 in an enlarged manner, and FIG. 4 is a sectional view of a part of FIG. 3 in a further enlarged manner. As shown in FIG. 2 to FIG. 4, the FOP 1 includes a plurality of cores 5 that transmit light, a plurality of claddings 6 that cover the outer peripheral portions of the cores 5, and a glass body 8 disposed among the fibers 7. The glass body 8 has absorbability for absorbing light (stray light) leaking from the fibers 7 and antimicrobial activities obtained by containing silver oxide. The core 5 and the cladding 6 constitute the fiber 7. The FOP 1 shown in FIG. 2 to FIG. 4 is adopted mainly in a product whose numerical aperture (NA) of the FOP 1 is not more than 1.

The cores 5 are fibriform members, and are aligned in a direction crossing the axial direction. The cores 5 are made of core glass, and have a function of transmitting light that entered from one end to the other end.

The plurality of claddings 6 are provided corresponding to the plurality of cores 5, and are made of clad glass with a refractive index lower than that of the core glass. The refractive index of the cladding 6 is lower than the refractive index of the core 5, so that light that entered the inside of the core 5 is totally reflected by the interface between the core 5 and the cladding 6. Therefore, the core 5 can propagate light from one end to the other end.

The glass body 8 is interposed among the plurality of fibers 7. The glass body 8 is disposed to cover the outer peripheral portions of the fibers 7. The glass body 8 consists of absorbing glass portions (first glass portion) 9 and antimicrobial glass portions (second glass portions) 10.

The absorbing glass portion 9 has a rod-like shape (single fiber) as shown in FIG. 4, and a plurality of absorbing glass portions are disposed to surround the outer peripheral portion of the cladding 6. The absorbing glass portions 9 are made of absorbing glass having absorbability for absorbing stray light.

Figure 5:
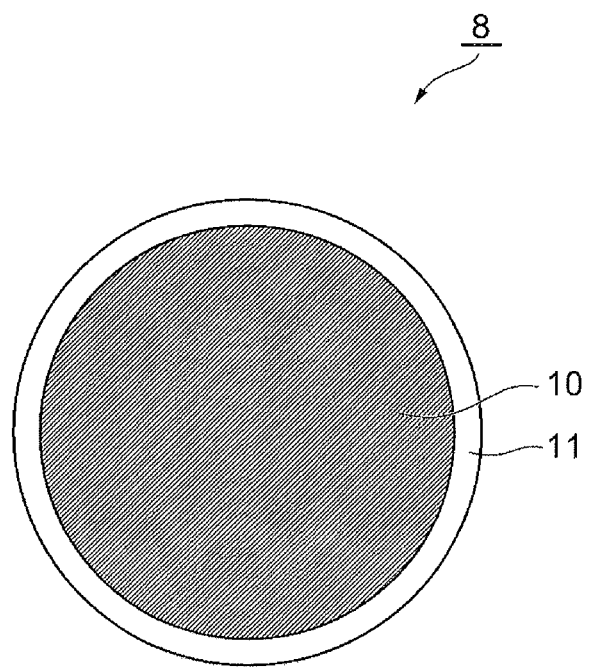
FIG. 5 is a sectional view showing details of an antimicrobial glass portion.

The antimicrobial glass portion 10 has, as shown in FIG. 4, a rod-like shape (single fiber), and a plurality (four in FIG. 4) of antimicrobial glass portions are disposed on the outer peripheral portion of the cladding 6 and among the absorbing glass portions 9. The antimicrobial glass portions 10 are made of antimicrobial glass with antimicrobial activities. FIG. 5 is a sectional view showing details of the antimicrobial glass portion 10. As shown in FIG. 5, the outer peripheral portion of the antimicrobial glass portion 10 is covered by a covering glass portion (third glass portion) 11 made of clad glass that does not contain silver oxide. The covering glass portion 11 has the same composition as that of the claddings 6 described later. The antimicrobial glass portions 10 occupy approximately 6% of the entire end face (refer to FIG. 3) of the FOP 1.

Next, the sizes of the above-described cores 5, the claddings 6, the absorbing glass portions 9, and the antimicrobial glass portions 10 will be described with reference to FIG. 6. As shown in FIG. 6, the cores 5 have a diameter of 30 mm, and the claddings 6 have a diameter of 40 mm and a thickness of 4 mm. Both of the absorbing glass portions 9 and the antimicrobial glass portions 10 have a diameter of 4 mm.

Subsequently, constituent materials of the FOP 1 will be described in detail with reference to FIG. 7. FIG. 7 is a diagram showing examples of compositions and characteristics of the cores 5, the claddings 6, the absorbing glass portions 9, and the antimicrobial glass portions 10. In FIG. 7, the contents of compositions are shown in percentages by weight. As shown in FIG. 7, the core glass forming the cores 5 and the clad glass forming the claddings 6 are composed mainly of $SiO_2$ as a glass network forming oxide (NWF: Network former). The core glass and the clad glass do not become glass singly, and are composed by containing a glass network modifying oxide (NWM: Network modifier) that provides glass with appropriate properties by fusion with the NWF, and an intermediate oxide that has properties intermediate between the NWF and the NWM.

The absorbing glass forming the absorbing glass portions 9 is composed mainly of $SiO_2$. The absorbing glass contains $Fe_3O_4$. This $Fe_3O_4$ has a wide absorbing band, and by containing $Fe_3O_4$ in the absorbing glass portions 9, absorption characteristics excellent from a visible light region to a near-infrared region can be obtained. The absorbing glass portions 9 also contain other materials such as PbO.

The antimicrobial glass forming the antimicrobial glass portions 10 contains $B_2O_3$, $SiO_2$, $Al_2O_3$, $Na_2O$, BaO, CaO, and $Ag_2O$ as raw materials. $B_2O_3$ acts as an NWF forming the framework of glass, and also contributes to uniform emission of silver ions (Ag ions). $B_2O_3$ is contained in a proportion of 20 to 30% of the entirety of the antimicrobial glass portions 10. $SiO_2$ acts as an NWF, and also contributes to prevention of yellowing due to $Ag_2O$. $Al_2O_3$ emits aluminum ions, and contributes to stabilization of silver ions by coupling to silver ions. $Na_2O$ acts as an NWM, and has an activity of improving the transparency of the antimicrobial glass portion 10 and an activity of promoting fusion and elution of glass. BaO and CaO have an activity of assisting fusion of glass.

$Ag_2O$ (silver oxide) is an essential component of the antimicrobial glass portion 10, which is eluted in glass and becomes silver ions having antimicrobial activities, and gives the antimicrobial glass portion 10 the antimicrobial activities. The content of $Ag_2O$ is approximately 0.5 mass %.

Next, an example of a method for producing an FOP 1 using the above-described constituent materials will be described. A method for manufacturing the FOP 1 (refer to FIG. 2) having the above-described configuration will be referred to as an EMA (Extra Mural Absorption) method.

First, a composite body faulted of core glass forming the core 5, clad glass forming the cladding 6, and the absorbing glass portion 9 and the antimicrobial glass portion 10 is put into a heating device and stretched with a roller, and accordingly, a single fiber is obtained.

Next, by using the manufactured single fiber, a multi-fiber is manufactured. The multi-fiber is obtained by heating and welding a plurality of single fibers by aligning the plurality of single fibers, and putting the single fibers in a heating device and stretching with a roller.

Subsequently, by aligning multi-fibers in an octagonal mold of a hot pressing machine and pressing them at a high temperature, the plurality of multi-fibers are heated and welded, and accordingly, an octagonal ingot is obtained. Then, the ingot is sliced perpendicularly to the axial direction and polished, and accordingly, an FOP 1 is obtained.

As described above, in the FOP 1 according to the present embodiment, a glass body 8 is configured by including the antimicrobial glass portions 10 made of antimicrobial glass containing $Ag_2O$. Here, the glass containing silver does not have chemical durability, so that it has properties to easily emit Ag ions due to moisture. Ag ions have an excellent antimicrobial effect. Therefore, the glass body 8 is configured by including the antimicrobial glass portions 10 containing $Ag_2O$, and accordingly, the glass body 8 can be provided with a sterilization effect due to the action of Ag ions. Therefore, the FOP 1 can be provided with antimicrobial activities.

It is difficult to make the cores 5 and the claddings 6 of antimicrobial glass in terms of transmittance and production. However, by making the antimicrobial glass portions 10 constituting the glass body 8 of antimicrobial glass, antimicrobial activities of the FOP 1 can be realized while the above-described problem is solved.

The antimicrobial glass portion 10 is covered by a covering glass portion 11 that does not contain silver oxide. Ag ions become metallic Ag due to coexistence with Fe ions in glass. This metallic Ag may deteriorate the sterilization effect of the antimicrobial glass surface. Therefore, by covering the antimicrobial glass portion 10 provided with antimicrobial activities obtained by containing $Ag_2O$ by the covering glass portion 11 that does not contain $Ag_2O$, coexistence with Fe ions of the absorbing glass portion 9 can be avoided, so that the sterilization effect can be prevented from being deteriorated. As a result, the FOP 1 can be more reliably provided with antimicrobial activities.

Embodiment 1

Hereinafter, the present invention will be described in greater detail based on embodiments and conventional examples, however, the following embodiments are not intended to limit the present invention at all.

The inventors of the present invention manufactured a FOP having the above-described configuration. FIG. 8 shows compositions and properties of antimicrobial glasses used for manufacturing the FOP. The antimicrobial effect of this FOP was evaluated according to the following steps. An antimicrobial test for the FOP was conducted according to a test method conforming to JIS Z 2801 2000. Specifically, the surfaces of a conventional unprocessed specimen not containing $Ag_2O$ and a specimen of the embodiment were inoculated with test microbes, and the counts of viable microbes after culture for 24 hours were measured. JIS regulates that in the case where a logarithmic value difference (antimicrobial activity value) between the count of viable microbes of the conventional unprocessed specimen and the count of viable microbes of the specimen of the embodiment is not less than 2.0, the antimicrobial effect is effective. As test strains, Staphylococcus aureus and coliform bacillus were used. The number of inoculated microbes of Staphylococcus aureus was $1.8 \times 10^5$, and the number of inoculated microbes of coliform bacillus was $2.9 \times 10^5$.

The results obtained through the above-described test are shown in FIG. 9(*a*) and FIG. 9(*b*). The results shown in FIG. 9(*a*) and FIG. 9(*b*) show the results of an FOP including the antimicrobial glass of No. 11 of FIG. 8. As shown in FIG. 9(*a*) and FIG. 9(*b*), it was confirmed that the FOP of the embodiment had the antimicrobial effect.

FIG. 10 shows relative transmittances of the conventional FOP and the FOP of the embodiment. In both of the conventional example and the embodiment, the FOP has a fiber size of 15 μm and a thickness of 1.75 mm. The relative transmittances shown in FIG. 10 are relative transmittances for 850 nm diffusion light. As shown in FIG. 10, the relative transmittance of the FOP of the embodiment is substantially equal to that of the conventional FOP, so that it was confirmed that optical characteristics were substantially the same as those of the conventional product. Concerning the image quality, a substantially similar result was obtained.

Second Embodiment

Figure 11:
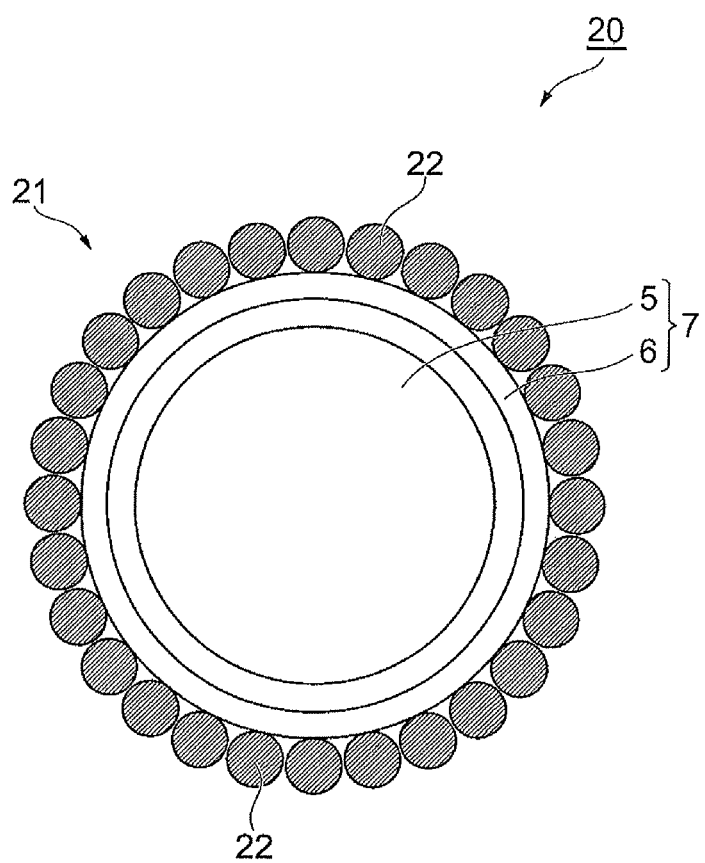
FIG. 11 is an enlarged sectional view of a part of a fiber optic plate according to a second embodiment of the present invention.

FIG. 11 is an enlarged sectional view of a part of a fiber optic plate according to a second embodiment of the present invention. As shown in FIG. 11, the FOP 20 is configured in much the same way as the FOP 1 of the first embodiment, and is different from the first embodiment in that the glass body 21 is formed of absorbing glass portions (glass portions) 22.

Specifically, in the first embodiment, the outer peripheral portion of the cladding 6 is covered by a glass body 8 consisting of absorbing glass portions 9 and antimicrobial glass portions 10, however, in the second embodiment, the cladding 6 is covered by a glass body 21 consisting of the absorbing glass portions 22. The absorbing glass portions 22 are made of a glass material with absorbability and antimicrobial activities. This glass material is made of the absorbing glass and antimicrobial glass containing $Ag_2O$ shown in the first embodiment. The materials to be used for the core 5 and the cladding 6 are the same as in the first embodiment. The FOP 1 is manufactured according to the same production method as that for the FOP 1 of the first embodiment.

As described above, in the FOP 20 according to the second embodiment, as in the first embodiment, the absorbing glass portions 22 contain $Ag_2O$, so that the glass body 21 can obtain a sterilization effect according to the action of Ag ions. Therefore, the FOP 20 can be provided with antimicrobial activities.

The present invention is not limited to the above-described embodiments.

For example, the glass body 8 of the first embodiment is not limited to the above-described configuration. The glass body 8 may be formed of an absorber with absorbability and antimicrobial activities and antimicrobial glass portions. The glass body 8 may be formed of an absorber and antimicrobial glass portions with absorbability and antimicrobial activities.

Figure 12:
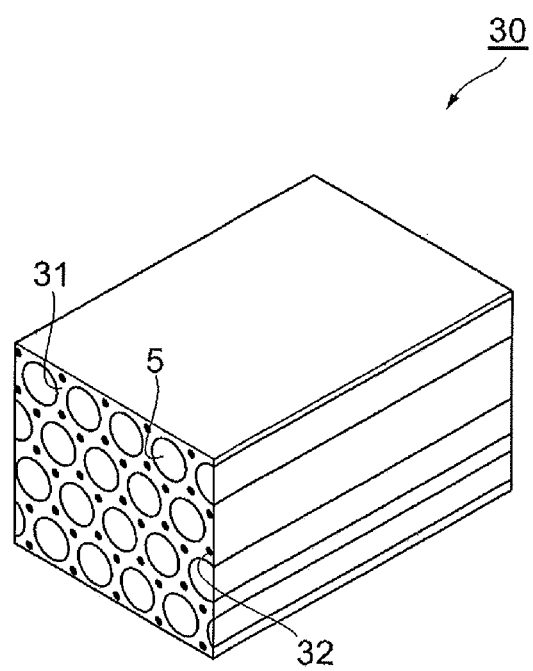
FIG. 12 is a view showing an internal structure of a fiber optic plate manufactured according to an ISA method in an enlarged manner.

The above-described FOPs 1 and 20 are manufactured according to the EMA method, however, they may be manufactured according to a method called an ISA (Interstitial Absorption) method. Specifically, FIG. 12 shows an FOP manufactured according to the ISA method. As shown in this figure, in the FOP 30 manufactured according to the ISA method, the cladding 31 is formed integrally and covers the outer peripheral portions of the plurality of cores 5. Further, the cladding 31 covers the outer peripheral portions of the absorbing glass portions 32. The absorbing glass portions 32 are made of the same material as in the second embodiment.

The absorbing glass portions 9, 22, and 32 may not be rod-shaped, but may be tubular. The claddings 6 covering the antimicrobial glass portions 10 may not be necessarily provided.

INDUSTRIAL APPLICABILITY

According to the present invention, a fiber optic plate can be provided with antimicrobial activities.

REFERENCE SIGNS LIST 1, 20, 30: Fiber optic plate (FOP), 5: Core, 6, 31: Cladding, 8, 21: Glass body, 9: Absorbing glass portion (first glass portion), 10: Antimicrobial glass portion (second glass portion), 11: Covering glass portion (third glass portion), 22, 32: Absorber (glass portion)

The invention claimed is:

1. A method for producing a fiber optic plate configured by bundling a plurality of optical fibers, comprising:
   forming a composite body by disposing a plurality of absorbent glass portions around a fiber having a core covered with a cladding, and disposing a plurality of antimicrobial glass portions, each formed from antimicrobial glass and having an outer peripheral portion formed using silver oxide-free covering glass, around the fiber and between the absorbent glass portions;
   heating and extending the composite body to obtain a single fiber;
   obtaining a plurality of single fibers wherein each single fiber of the plurality of single fibers is produced by the same method as the single fiber; and
   twisting and heat welding the plurality of the single fibers together.

* * * * *